United States Patent
Ogusu et al.

[11] Patent Number: 6,002,659
[45] Date of Patent: Dec. 14, 1999

[54] DISK DRIVE DEVICE

[75] Inventors: Mikio Ogusu; Shinji Ohba; Hiroshi Sobukawa, all of Hamamatsu, Japan

[73] Assignee: Yamaha Corporation, Shizuoka-ken, Japan

[21] Appl. No.: 08/891,219

[22] Filed: Jul. 10, 1997

[30] Foreign Application Priority Data

Jul. 26, 1996 [JP] Japan .................................. 8-198157

[51] Int. Cl.⁶ ........................... G11B 17/04; G11B 33/02
[52] U.S. Cl. ........................................ 369/75.2; 369/77.2
[58] Field of Search ................................. 369/75.1, 75.2, 369/77.1, 77.2, 258, 261, 264; 360/99.02, 99.03, 99.06, 99.07

[56] References Cited

U.S. PATENT DOCUMENTS

| | | | |
|---|---|---|---|
| 4,815,065 | 3/1989 | Rouws | 369/77.2 |
| 5,166,918 | 11/1992 | Kamijo | 369/77.1 |
| 5,184,342 | 2/1993 | Ishii | 369/77.2 |
| 5,577,008 | 11/1996 | Kanazawa et al. | 369/77.2 |
| 5,805,553 | 9/1998 | Hamakawa et al. | 369/75.2 |
| 5,812,511 | 9/1998 | Kawamura et al. | 369/77.2 |

FOREIGN PATENT DOCUMENTS

| | | |
|---|---|---|
| 0532247 | 3/1993 | European Pat. Off. . |
| 0613133 | 8/1994 | European Pat. Off. . |
| 0696797 | 2/1996 | European Pat. Off. . |
| 6-076512 | 3/1994 | Japan . |

OTHER PUBLICATIONS

IBM Technical Disclosure Bulletin, "optical Drive Loader Configuration." (1995) May, No. 5, Armonk, NY, U.S., vol. 38, pp. 493–496.

*Primary Examiner*—David L. Ometz
*Attorney, Agent, or Firm*—Loeb & Loeb, LLP

[57] ABSTRACT

A movable guide for receiving a caddy is provided movably in the loading and unloading directions on a main chassis. The movable guide is moved by a drive mechanism from an eject position to a disk drive position. An arrangement is made so that by an action of front and rear guide pins engaged in front and rear cam slits of the main chassis, when the movable guide is at the eject position, a turntable of a traverse unit disposed below the main chassis is spaced by a predetermined distance from a disk and, as the movable guide is moved in the loading direction, approaches gradually to the disk and, when the movable guide reaches the disk drive position, the turntable is attracted to the disk. The turntable approaches the disk upwardly relatively from beneath the disk and is attracted smoothly to the disk by a series of continuous operation.

12 Claims, 16 Drawing Sheets

FIG. 2A
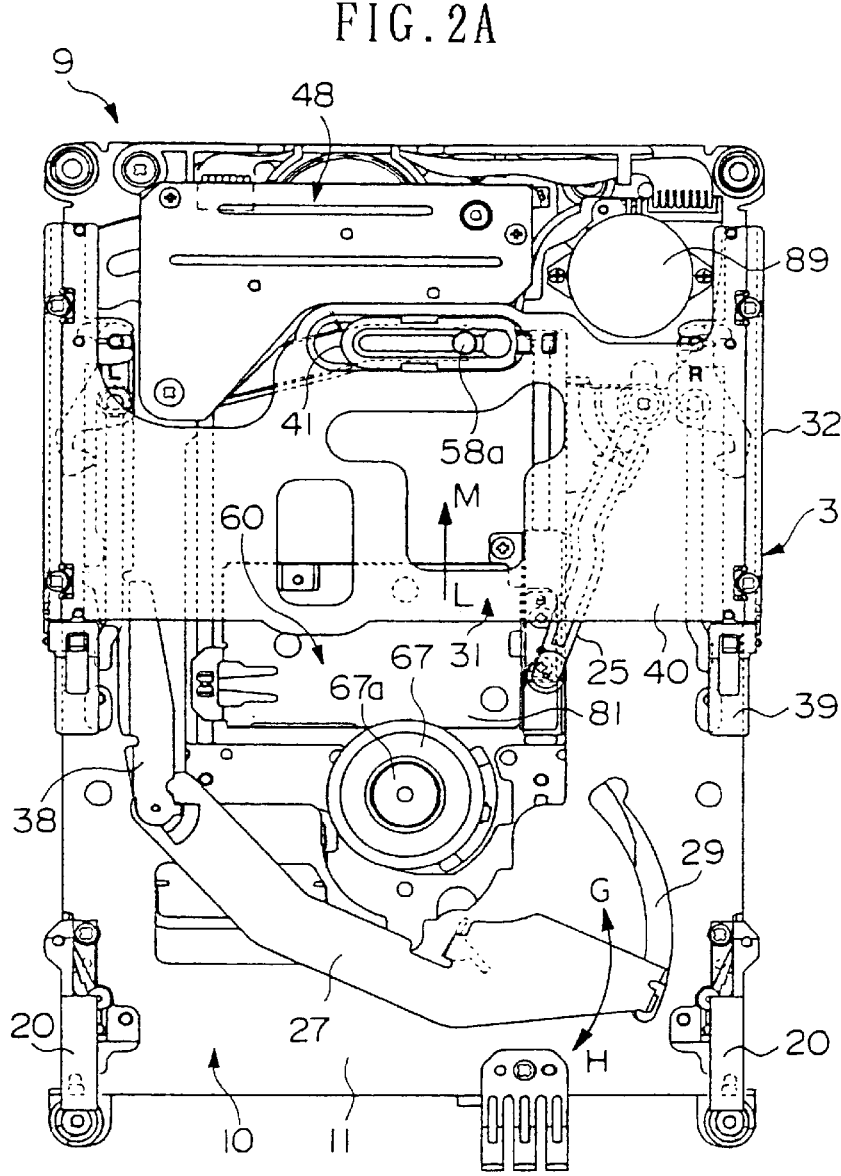
FIG. 2B
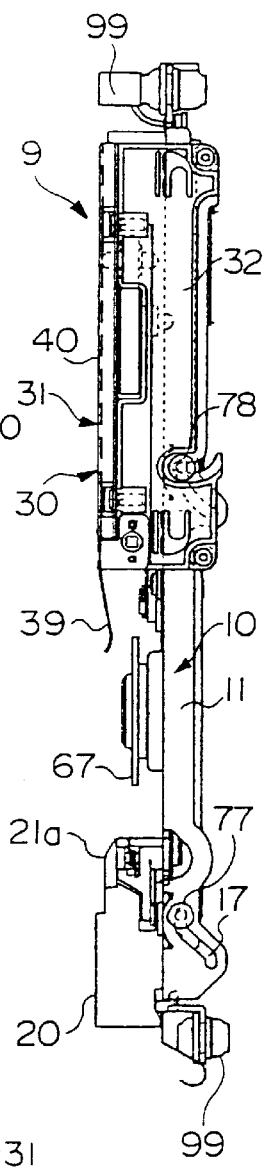
FIG. 2C

DISK DRIVE DEVICE

BACKGROUND OF THE INVENTION

This invention relates to a disk drive device for reproducing a disk on which signals are optically or magnetically recorded or writing signals on a disk and, more particularly, to a technique for loading a disk in such a disk drive device.

A magneto-optic disk capable of reading and writing a signal thereon, for example, is usually received in a caddy and is loaded in a disk drive device in the state received in the caddy. The caddy has a shutter for opening and closing an opening for exposing a disk surface on which signals are recorded and, in the state loaded in the disk drive device, this shutter is opened. The disk in the disk drive device is rotated by a turntable which is attracted to the central portion of the disk by magnetic force. Signals are recorded on or read from the disk by a pickup head moving in the radial direction of the disk through the opening of the caddy.

As a loading device for pulling in the caddy into the disk drive device and moving it to a disk drive position, a loading device of a type which inserts the caddy directly into the disk drive device is generally used. For example, in a loading device shown in FIG. 16, a caddy C containing a disk D is moved in a horizontal direction to a position above a traverse unit 112 having a turntable 110 and a pickup head 111 and then the caddy C is lowered to cause a portion-to-be-chucked 113 provided in the central portion of the disk D and consisting of a magnetic material to be attracted to the turntable 110. The caddy C on the traverse unit 112 is held in the disk drive position by engaging of a positioning pin 114 provided on the traverse unit 112 in a positioning hole 7 formed in the rear portion in the loading direction of the lower portion of the caddy C. There is also a prior art loading device in which, as shown in FIG. 17, a traverse unit 112 is pivotably supported on one side thereof to a frame and is located in a lowered position before insertion of a caddy C. When the caddy C has been horizontally moved to a position above the traverse unit 112, the traverse unit 112 is pivoted upwardly to cause a portion-to-be-chucked 113 to be attracted by a turntable 110.

In both of the prior art loading devices, for moving the caddy C in the device, a hook (not shown) is engaged in one of hook holes 6 formed typically in side surfaces of the caddy C and this hook is driven by a motor to move the caddy C along a guide (not shown).

In any of the prior art loading devices, the turntable 110 is attracted by magnetic force to the portion-to-be-chucked 113 of the disk D and, therefore, an operation immediately before attraction of the turntable 110 must be made instantly. Since, however, the direction of the horizontal displacement of the caddy C and the direction of movement of the portion-to-be-chucked 113 to match the turntable 110 are largely different from each other, it is difficult to change the operation as a series of continuous operation without a break. If an error takes place in a position and timing of change in the operation, the disk D will not be chucked correctly by the turntable 110 and this will cause malfunction in the disk drive.

Further, in the prior art loading device in which the caddy C is pulled in by engaging the hook in the hook hole 6, the caddy C tends to be pulled in to an inclined posture due to clearance produced between the caddy C and the guide portion. If the disk D reaches the drive position in this state, the portion-to-be-chucked 113 will not be in register with the turntable 110 and a malfunction in chucking will take place.

It is, therefore, an object of the present invention to provide a disk drive device in which a traverse unit can be accessed smoothly and accurately to a disk in a caddy loaded in the disk drive device.

SUMMARY OF THE INVENTION for achieving the above described object of the invention, a disk drive is provided device comprising a chassis, a loading unit for moving a disk containing caddy inserted to an eject position on the chassis in a loading direction to a disk drive position and moving back the disk containing caddy from the disk drive position in an unloading direction to the eject position, and a traverse unit having a turntable which is attracted to the disk which has reached the disk drive position and rotates the disk and reading a signal recorded on the disk or writing a signal on the disk while rotating the disk by means of the turntable. The loading unit comprises a movable guide provided on the chassis movable between the eject position and the disk drive position and receives the inserted disk containing the caddy at the eject position, and a drive unit for moving said movable guide. The traverse unit engages to the movable guide. The traverse unit is movable in the loading and unloading directions as the movable guide is moved, and also is connected to the chassis through a guide member in such a manner that, when the movable guide is at the eject position, the turntable is spaced apart by a predetermined distance from the disk and, as the movable guide moves in the loading direction, approaches the disk gradually and, when the movable guide reaches the disk drive position, is attracted to the disk.

According to the invention, the inserted caddy is received by the movable guide of the loading unit which awaits the caddy at the eject position and the movable guide is moved by the drive unit to the disk drive position whereby the disk in the caddy reaches the disk drive position. As the movable guide moves, the traverse unit which is coupled to to the movable guide is also moved in the loading direction. During the movement of the traverse unit, the turntable of the traverse unit gradually approaches the disk by means of the guide member and, when the movable guide reaches the disk drive position, is attracted to the disk. Since the turntable approaches the disk gradually from relatively beneath the disk and is attracted to the disk through a continuous operation, malfunction in chucking of the disk can be prevented and the disk can be accurately driven.

In one aspect of the invention, the caddy has engaging portions on both sides thereof in the loading direction and the movable guide has portions-to-be-engaged which are engaged with the engaging portions when the movable guide has received the caddy.

According to this aspect of the invention, the caddy is moved with the movable guide with the engaging portions on both sides of the caddy being engaged with the portions-to-be engaged of the movable guide and, therefore, the caddy is moved to the disk drive position maintaining a correct posture so that an accurate positioning of the disk to the turntable is ensured.

In another aspect of the invention, an elastic member which presses the caddy elastically to the movable guide is provided in a forward end portion in the unloading direction of the movable guide.

According to this aspect of the invention, since the caddy which is moved in the state received in the movable guide is pressed by the elastic member to the movable guide, the behaviour of the caddy during the movement and during rotation of the disk is restricted and, therefore, an accurate driving of the disk is ensured.

According to still another aspect of the invention, the disk drive device having the elastic member further comprises a fixed guide provided at a forward end portion in the unloading direction of the chassis for guiding the inserted caddy to the movable guide located at the eject position and, when the movable guide is at the eject position, spacing the elastic member away from the caddy.

According to this aspect of the invention, the direction of insertion of the caddy into the movable guide is determined by this fixed guide. Since the elastic member is spaced away from the caddy when the movable guide is at the eject position, the elastic member is not in sliding contact with the caddy when the caddy is inserted into the movable guide. Therefore, no scratch is caused on the surface of the caddy and, moreover, since sliding resistance is reduced, the caddy can be inserted smoothly into the movable guide.

Preferred embodiments of the invention will be described below with reference to the accompanying drawings.

BRIEF DESCRIPTION OF THE DRAWINGS

In the accompanying drawings,

FIG. 2A is a top plan view of a drive unit of the disk drive device;

FIG. 2B is a side elevation of the drive unit;

FIG. 2C is a front view of the drive unit;

DESCRIPTION OF THE PREFERRED EMBODIMENTS

Referring to the accompanying drawings, embodiments of the invention will now be described.

(1) Structure of an embodiment

Figure 1A:
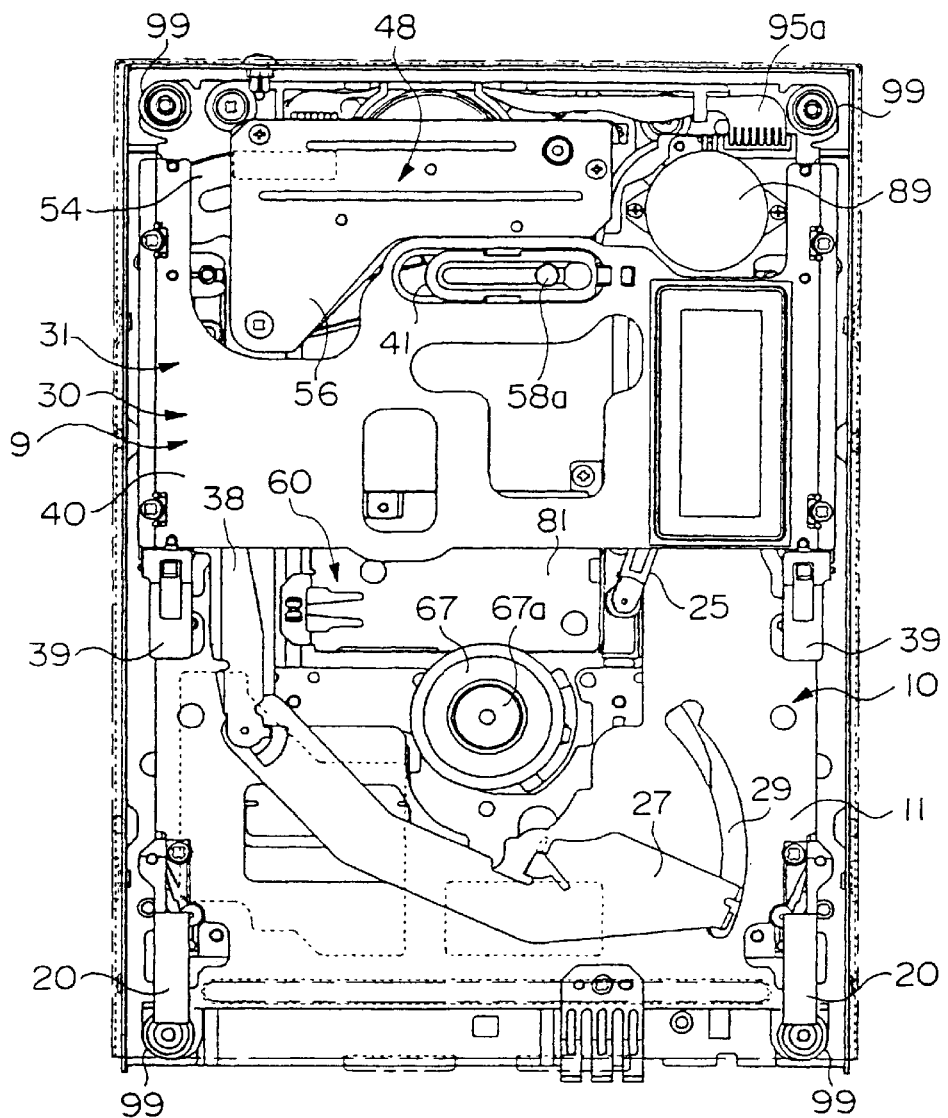
FIG. 1A is a top plan view showing an embodiment of a disk drive device made according to the invention.
Figure 1B:
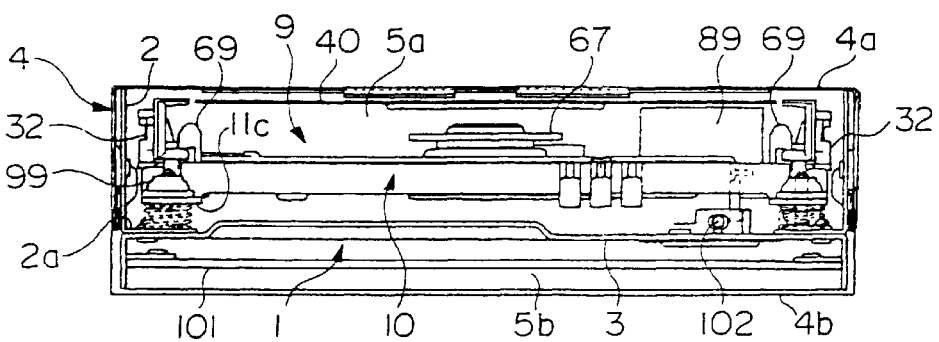
FIG. 1B is a front view of the embodiment.
Figure 13:
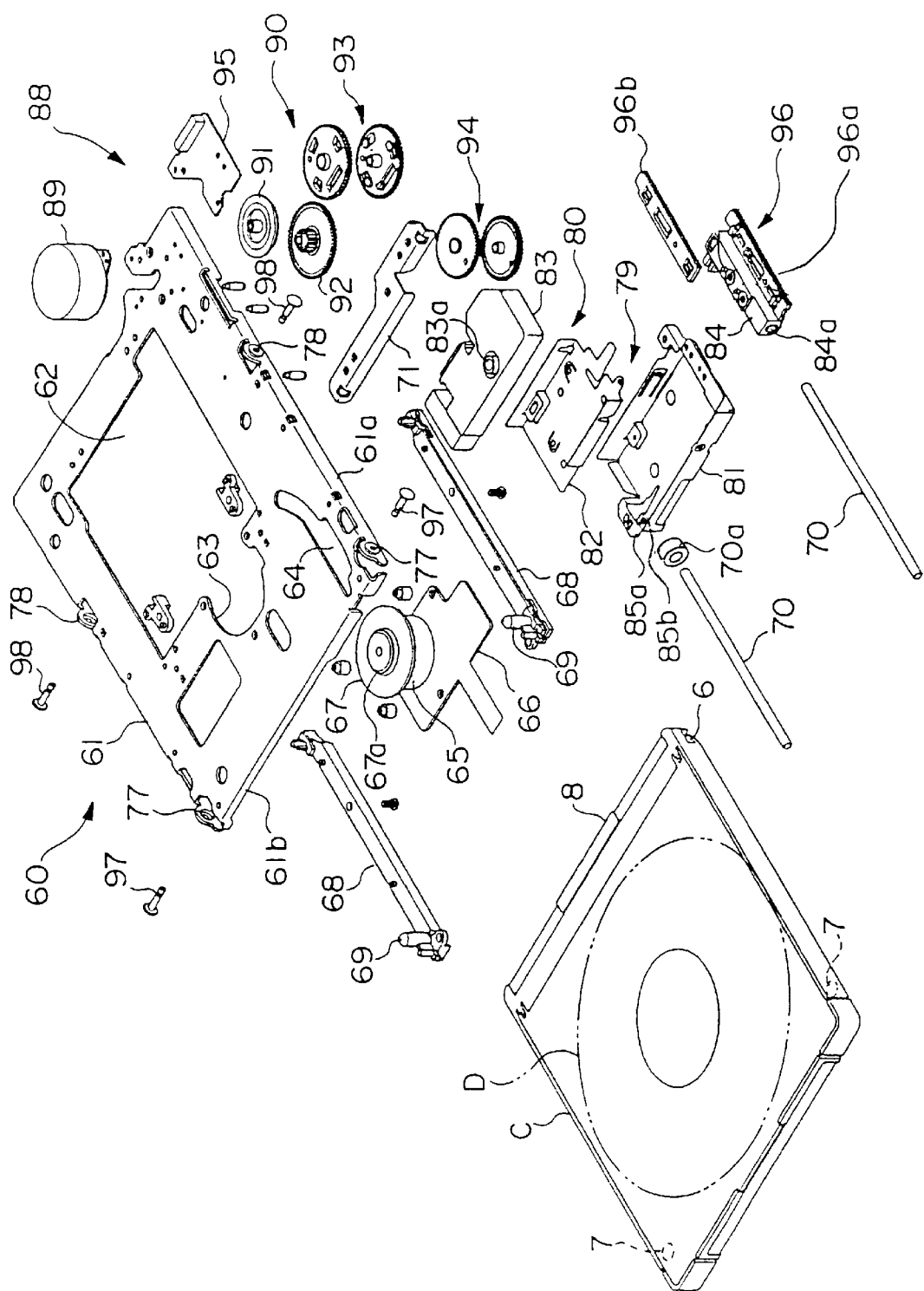
FIG. 13 is an exploded perspective view of the traverse unit.

FIGS. 1A and 1B show an embodiment of the disk drive device according to the invention. In this device, a disk D such as a magneto-optic disk received in a caddy C shown in FIG. 13 is loaded in the state in which it is housed in the caddy C. A signal recorded on the disk D is read or a signal is written on the disk D while the loaded disk D is rotated.

In FIGS. 1A and 1B, a frame unit 1 is constructed of a rectangular main frame 2 and a plate-like under frame 3 which is disposed below the main frame 2 and fixed to the lower surface of the main frame 2. An unillustrated front frame is fixed to the front surface (lower surface as viewed in FIG. 1A) of the main frame 2. A drive unit 9 shown in FIGS. 2 to 5 is provided on the under frame 3. The frame unit 1 and the drive unit 9 are covered with a top cover 4a which is fixed to the upper surface of the main frame 2, a bottom cover 4b which is fixed to the lower surface of the under frame 3 and an unillustrated front panel which is fixed to the front surface of the main frame 2. A casing 4 of the disk drive device is formed by the top cover 4a, bottom cover 4b and the front panel. The casing 4 is partitioned to a drive unit chamber 5a which is an upper chamber and a substrate chamber 5b which is a lower chamber by the under frame 3. The drive unit 9 is disposed in the drive unit chamber 5a and a main substrate 101 to be described later is disposed in the substrate chamber 5b.

The drive unit 9 is an assembly of a chassis unit 10, a loading unit 30 which is disposed on the chassis unit 10, and a traverse unit 60 which is disposed below the chassis unit 10. The caddy C is inserted in the direction of arrow A in FIGS. 4 and 5 and taken out in the direction of arrow B.

In the description made below, description concerning directions such as "front", "rear", "left" and "right" designates directions relative to the direction of insertion of the caddy C. That is to say, the caddy C is inserted from the front side to the rear side of the device. Further, as shown in FIG. 13, the caddy C in the inserted state is formed with hook holes 6 in the rear end portion of the two side surfaces and is formed with positioning holes 7 in the front end portion of the lower surface.

First, the chassis unit 10, the loading unit 30 and the traverse unit 60 will be described in this order.

A. Chassis Unit

Figure 6:
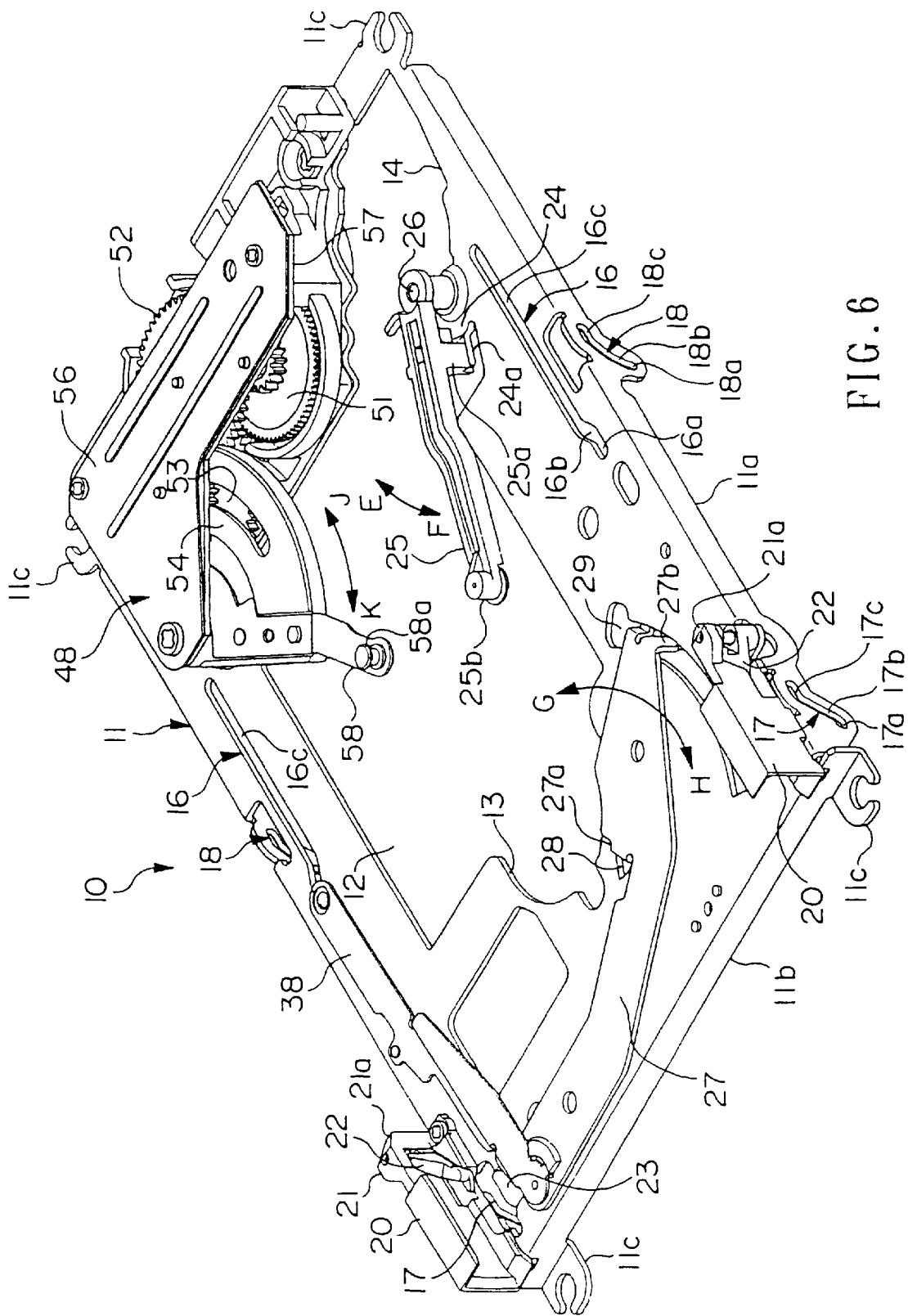
FIG. 6 is a perspective view showing a chassis unit.
Figure 7:
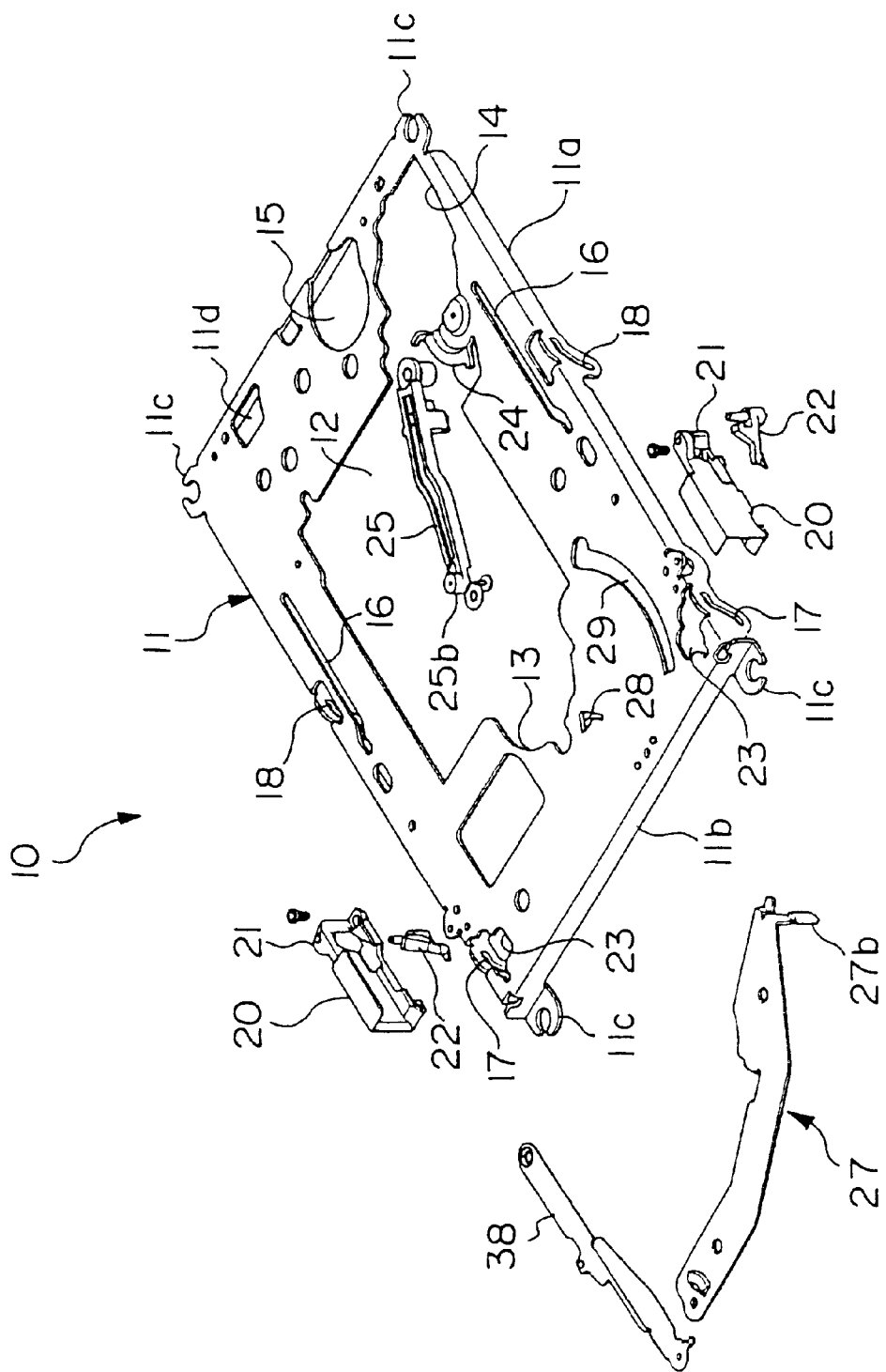
FIG. 7 is an exploded perspective view of the chassis unit.

As shown in FIGS. 6 and 7, the chassis unit 10 includes, as its main element, a main chassis 11 made of a thin rectangular metal plate. Long edge portions and short edge portions of the main chassis 11 are bent downwardly at a right angle to form bent portions 11a and 11b. A substantially rectangular central opening 12 is formed in the central portion of the main chassis 11. In the front central portion of the main chassis 11 is formed a semicircular front recessed portion 13 which is continuous to the central opening 12. In the rear central portion of the main chassis 11 is formed a rear recessed portion 14 which extends to the vicinity of the rear right corner of the main chassis 11 and is continuous to the central opening 12. On the left side of the rear recessed portion 14 is formed a loading motor mounting opening 15. On both sides of the central opening 12 are formed hook cam slits 16 extending in the forward and rearward directions of the main chassis 11 symmetrically with respect to a center line extending in the forward and rearward directions of the main chassis 11. These hook cam slits 16 are slits which guide guide pins 37c (to be described later) and each consists of a short eject section 16a, an oblique section 16b extending rearwardly and inwardly from the eject section 16a and a pull-in section 16c extending rearwardly from the oblique section 16b in parallel to the eject section 16a.

In front end portions and central portions of the left and right bent portions 11a are front cam slits 17 and rear cam slits 18 for guiding the traverse unit 60. The front cam slits 17 each consist of a stop hole section 17a formed in the front lower portion of the bent portion 11a and extending rearwardly, a lift up section 17b extending rearwardly from the stop hole section 17a and obliquely upwardly by a predetermined angle and a short horizontal section 17c extending rearwardly from the lift up section 17b. The rear cam slits 18 each consist of a stop hole section 18a formed in the front lower portion of the central bent portion 11a, a lift up section 18b extending rearwardly from the stop hole section 18a and obliquely upwardly by a predetermined angle and a short horizontal section 18c extending rearwardly from the lift up section 18b.

A section of the front cam slit 17 connecting the stop hole section 17a and the lift up section 17b and a section of the front cam slit 17 connecting the lift up section 17b and the horizontal section 17c are formed smoothly in the forward and rearward direction. The lift up section 18b of the rear cam slit 18b of the rear cam slit 18 rises from the stop hole section 18a with a larger inclination angle than the inclination angle of the lift up section 17b of the front cam slit 17, is slightly bent upwardly and continues to the horizontal section 18c with a curve which becomes more gradual toward the front end.

In both side portions of the front end portion of the main chassis 11 are provided a pair of fixed guides 20. These guides 20 are formed in the section of the letter C and fixed to the main chassis 11 in such a manner that their channel portions oppose each other. These fixed guides 20 each have a mounting piece 21 at the rear end thereof. A lever 22 for preventing an erroneous insertion of the caddy C is attached to the mounting piece 22. The rear upper surface of the mounting piece 21 is formed in an inclined surface 21a. A positioning pin insertion hole 23 is formed in the main chassis 11 in a portion inside of each fixed guide 20.

An arcuate base piece 24 is formed integrally with the main chassis 11 in a front right side of the rear recessed portion 14. To this base piece 24 is mounted an open lever 25 for opening a shutter 8 of the caddy C. This open lever 25 is pivotably supported on the base piece 24 through a pivot pin 26. As shown in FIG. 6, the open lever 25 is rotated along the surface of the main chassis 11 in the directions of arrows E and F. The open lever 25 is normally biased in the direction of arrow F by means of an unillustrated coil spring mounted in the base portion of the open lever 25 and is held at a standby position at which a projecting portion 25a formed in the lower portion of the open lever 25 abuts against a stopper 24a of the base piece 24. At the standby position, the forward end portion of the open lever 25 is directed forwardly and slightly inwardly and a pin 25b is provided in the forward end portion for engaging and opening the shutter 8 of the caddy C.

An eject lever 27 of a substantially crescent shape extending transversely of the main chassis 11 is provided on the main chassis 11 forwardly of the front recessed portion 13. A downwardly bent pivot piece 27a is formed slightly rightwardly of a central portion of the eject lever 27 and this pivot piece 27a is engaged in a small triangular pivot hole 28 formed in the main chassis 11. By this arrangement, the eject lever 27 is adapted to be rotated about the pivot pin 27a along the upper surface of the chassis 11 in the directions of arrows G and H. The eject lever 25 is downwardly bent at its right end portion to form an engaging pawl 27b. This engaging pawl 27b is engaged in an arcuate slit 29 formed in the main chassis 11 and extends downwardly. The rotation of the eject lever is permitted by the arcuate slit 29.

B. Loading Unit

Figure 8:
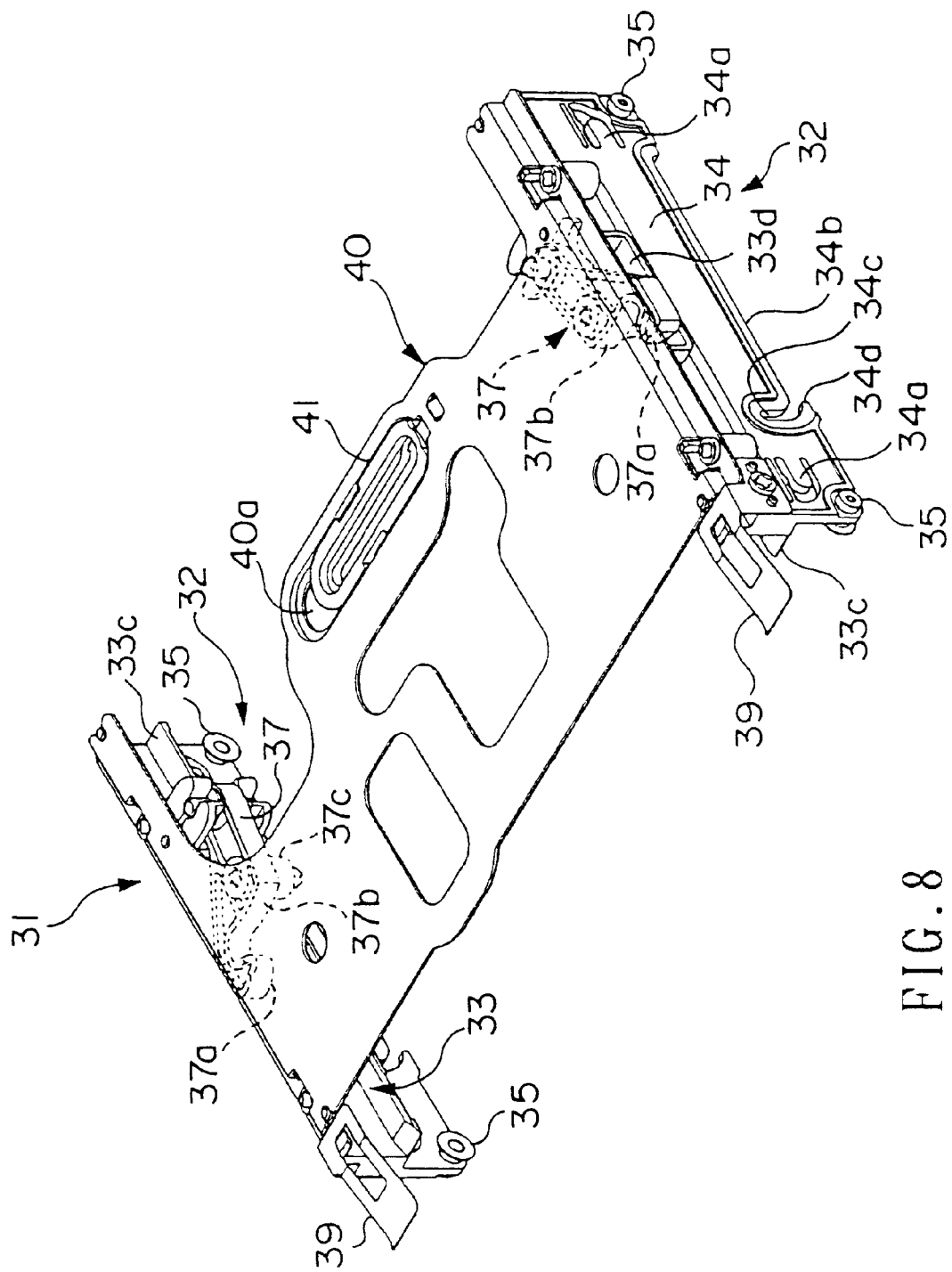
FIG. 8 is a perspective view showing a movable guide constituting a part of a loading unit.
Figure 9:
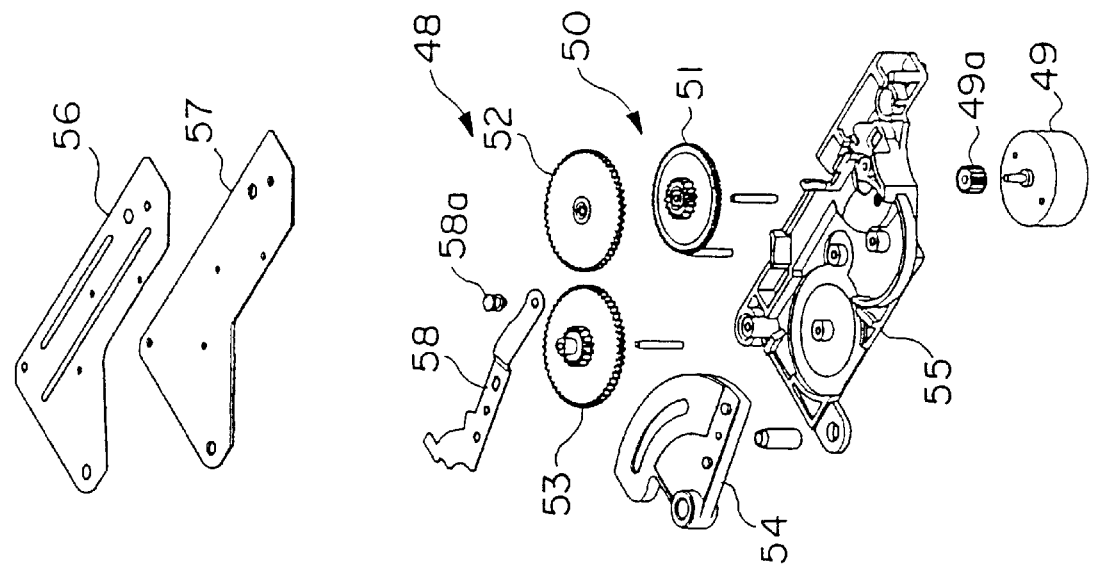
FIG. 9 is an exploded perspective view of the movable guide and a drive mechanism 48 constituting a part of the loading unit.
Figure 9:
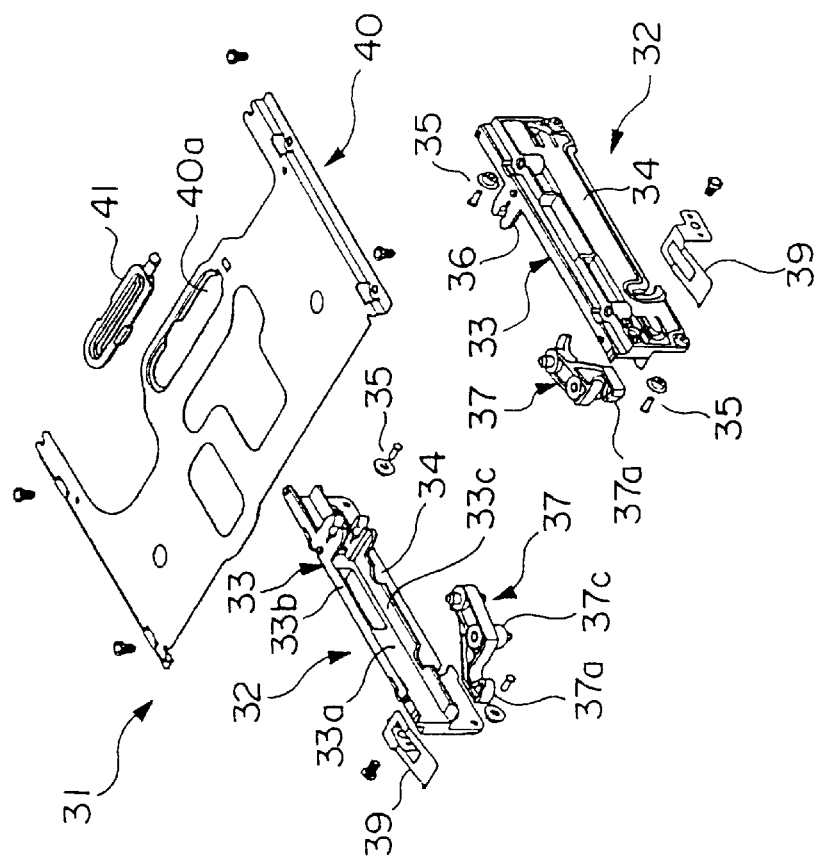
Figure 10:
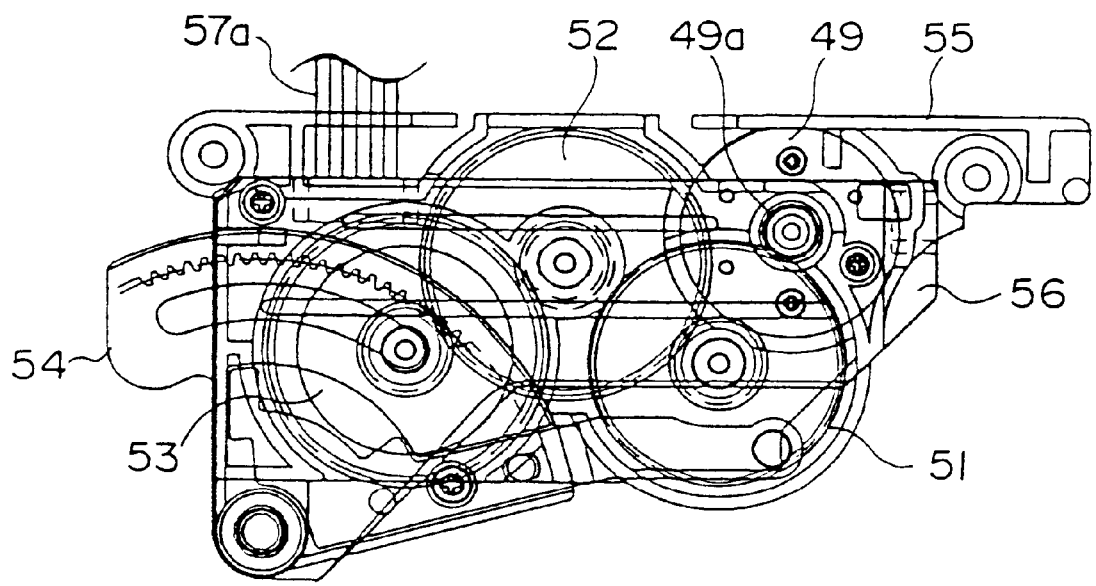
FIG. 10 is a top plan view of the drive mechanism constituting a part of the loading unit.
Figure 11:
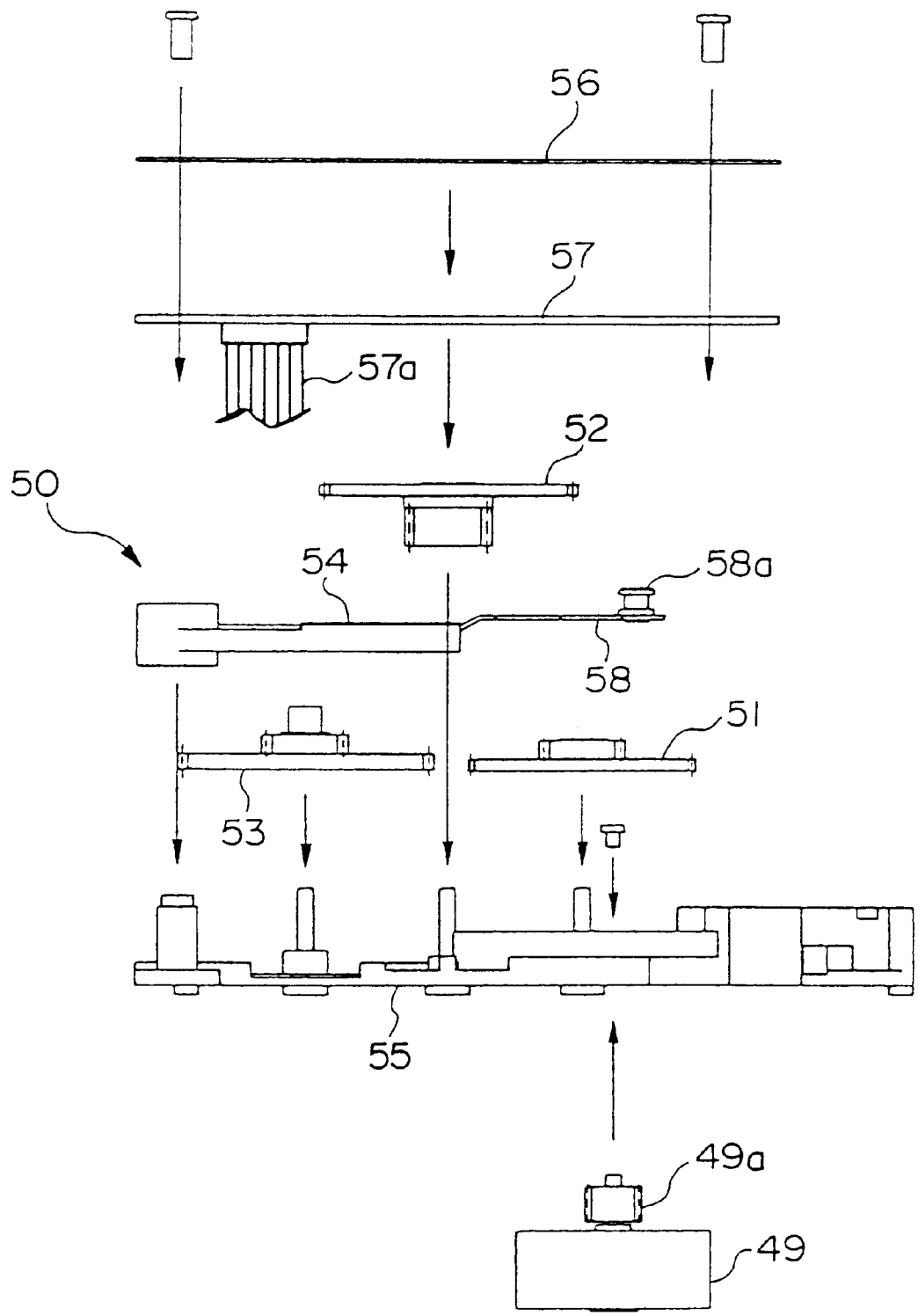
FIG. 11 is an exploded front view of the drive mechanism.
Figure 12:
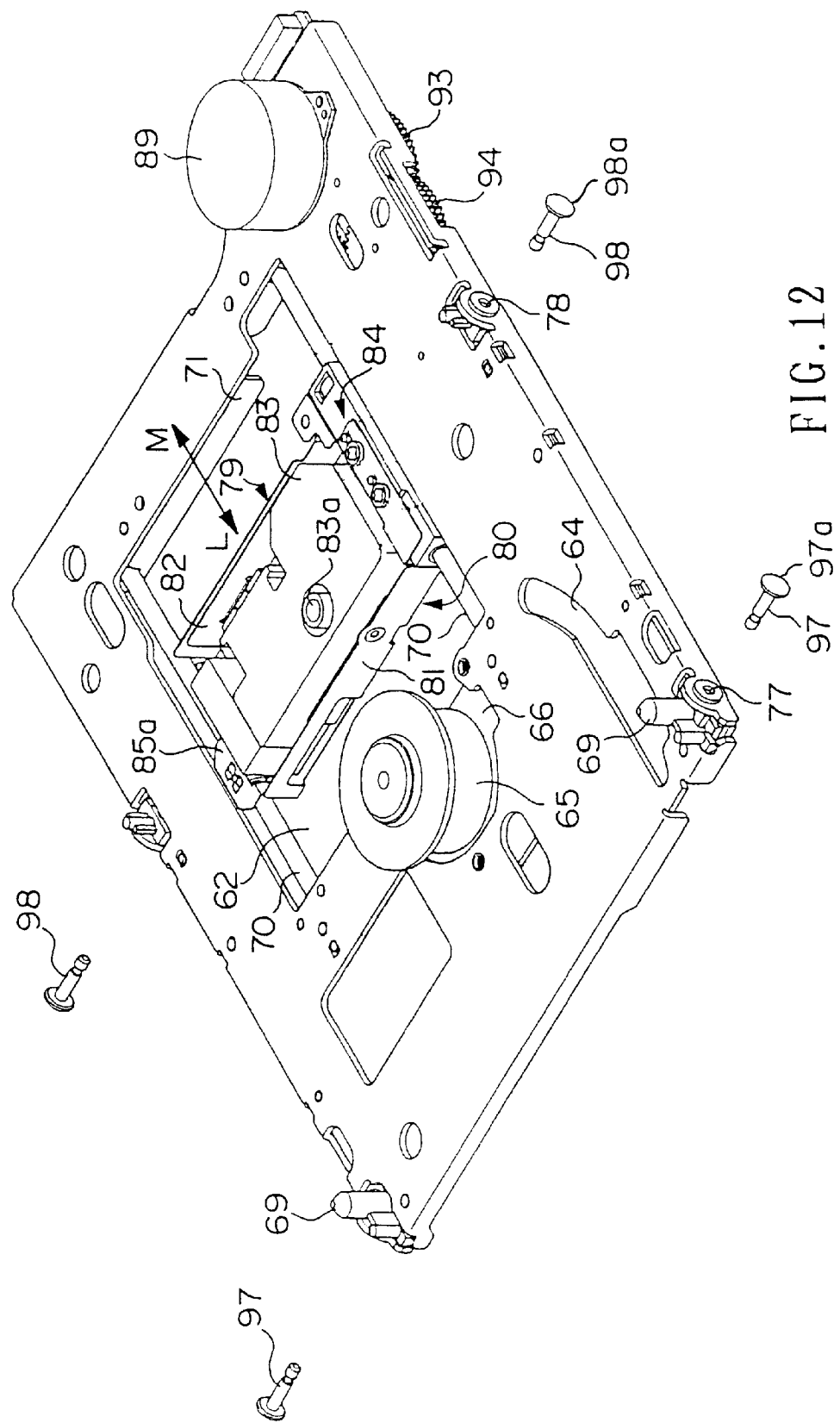
FIG. 12 is a perspective view of a traverse unit.

Referring now to FIGS. 6, 8 and 9, the loading unit 30 will be described.

The loading unit 30 includes a movable guide 31 which moves forwardly and rearwardly over the main chassis 11 and a drive mechanism 48 for driving this movable guide 31.

The movable guide 31 has a pair of sliders 32 and a guide plate 40 connecting these sliders 32 together. The pair of Sliders 32 are mounted on the bent portions 11a of the main chassis 11 in a manner that the movable guide 31 is movable along these bent portions 11a.

Each of the sliders 32 is formed in a generally rectangular shape extending in the forward and rearward directions and includes a guide section 33 and a lower plate section 34 formed under the guide section 33. The guide section 33 is formed in a generally C shape having a side plate section 33a, an inwardly extending upper holding plate section 33b and an inwardly extending lower holding plate section 33c and is adapted to receive the edge portion of the caddy C in the channel formed by these sections 33a, 33b and 33c. The lower plate section 34 extends vertically downwardly and continuously from the side plate section 33a. In the front and rear end portions of the lower plate section 34 are rotatably mounted rollers 35.

The sliders 32 are mounted to the main chassis 11 in such a manner that the sliders 32 hold the upper and lower edges of the bent portions 11a of the main chassis 11 with the lower holding plate sections 33c and the rollers 35 of the guide sections 33. The sliders 32 can be moved forwardly and rearwardly along the bent portions 11a. The lower holding plate section 33c is elastically deformable in the vertical direction and is formed on the lower surface in the front and rear portions thereof with minute projections (not shown). The lower plate section 34 is formed in the front and rear portions thereof with elastic pieces 34a. These elastic pieces 34a are also formed on the inside surface thereof with minute projections (not shown). These minute projections are brought into point contact and also sliding contact with the main chassis 11. By this arrangement, the sliding resistance produced by the movement of the movable guide 31 is reduced and the load applied to the sliders 32 in the vertical and leftward and rightward directions is absorbed by elastic deformation of the lower holding plate section 33c and elastic pieces 34a.

In the rear portion of each guide section 33, there is mounted a hook lever 37 through a support piece 36. This hook lever 37 is pivotably supported in its base portion by the support piece 36 and extends forwardly to form an inwardly projecting hook section 37a at its forward end portion. In a portion opposing the hook section 37a is formed a receiving surface 37b for receiving the caddy C. The hook lever 37 is adapted to be rotated with the movement of the movable guide 31 but its rotation is restricted in such a manner that its rotated position follows the hook cam slit 16 of the main chassis 11 due to a guide pin 37c which is fixedly provided in the central portion of the hook lever 37 and is engaged in the hook cam slit 16. In other words, when the movable guide 31 is at the foremost end eject position, the guide pin 37c is engaged in the eject section 16a of the hook cam slit 16 and the hook section 37a is located in an opening 33d formed in the side plate section 33a of the guide section 33 of the slider 32. At this time, the hook section 37a is not projecting inwardly from the inner surface of the side plate section 33a.

As the movable guide 31 is moved rearwardly (i.e., withdrawn) from the eject position, the guide pin 37c moves from the eject section 16a of the hook cam slit 16 to the oblique section 37c and the hook section 37a thereby is pivoted inwardly. When the guide pin 37c reaches the pull-in section 16c, the hook section 37a reaches an inwardly projecting engaging position. Since the pull-in section 16c is formed in the direction of the movement of the movable guide 31, the guide pin 37c does not move laterally and, therefore, the engaging position of the hook section 37a is maintained. When the movable guide 31 moves forwardly (i.e., advances) from the engaging position, the hook lever 37 moves in a direction reverse to the above described movement.

In the left end portion of the eject lever 27 is pivotably connected, through a pivot pin, a front end portion of a transmission lever 38, which extends in the forward and rearward directions. The rear end portion of the transmission lever 38 is pivotably connected, through a pivot pin, to the guide pin 37c of the left side hook lever 37. As the movable guide 31 moves forwardly and rearwardly, the eject lever 27 is rotated through the transmission lever 38.

The lower plate section 34 of each slider 32 is formed in its lower end portion with a shallow recessed portion 34b along the lower edge of the lower plate section 34. In the front end portion of the recessed portion 34b is formed an upwardly extending support slit 34c which communicates with the recessed portion 34b. In the lower portion of the front side of the support slit 34c is formed a rearwardly extending lift up pawl 34d.

A forwardly extending clamp 39 is mounted to the front end portion of each slider 32. This clamp 39 is made of a leaf spring and, by elastically abutting to the upper surface of the caddy C inserted in the guide section 33, presses the caddy C downwardly. When the movable guide 31 moves to the eject position from the rear, the clamp 39 rides on the inclined surface 21a of the fixed guide 20 and does not abut against the upper surface of the inserted caddy C.

The guide plate 40 bridges and is affixed to the upper surfaces of the pair of sliders 32. Thus, the sliders 32 are connected to each other by the guide plate 40 and maintained in the same forward and rearward positions with respect to the main chassis 11 by the guide plate 40. In the central portion of the guide plate 40 is formed an arm slit 40a extending in the leftward and rightward directions. A guide ring 41 is fitted in the arm slit 40a.

Referring to FIGS. 4 to 6 and FIGS. 9 to 11, the drive mechanism 48 of the loading unit 30 will be described.

The drive mechanism 48 is provided in the rear portion of the main chassis 11 and comprises as its principal component parts a loading motor 49 and a reduction gear group 50 rotated by the loading motor 49. The reduction gear group 50 consists of first, second, third and fourth gears 51, 52, 53 and 54. These gears are rotatably supported in a space defined by a gear base 55 fixed to the main chassis 11, a support plate 56 fixed to the gear base 55 and a base plate 57 disposed below the support plate 56. The base plate 57 is provided with a photosensor (not shown) detecting a rotated position of the fourth gear 54 and is also provided with a control circuit for controlling the operations of this photosensor and the loading motor 49. The loading motor 49 is fixed to the lower surface of the gear base 55. A drive gear 49a of the loading motor 49 is meshed with the first gear 51.

The fourth gear 54 is formed in a sectoral shape and its pivot portion is pivotably supported on the gear base 55. On the upper surface of the front end portion which extends straightly from the pivot portion of the gear 54 is affixed an arm 58 which extends along the end portion of the gear 54. This arm 58 projects by a predetermined length from the edge of the gear 54 and an arm pin 58a is provided in the foremost end portion of the arm 58. This arm pin 58a is slidably engaged in the guide ring 41 which is fitted in the arm slit 40a of the guide plate 40.

Figure 4:
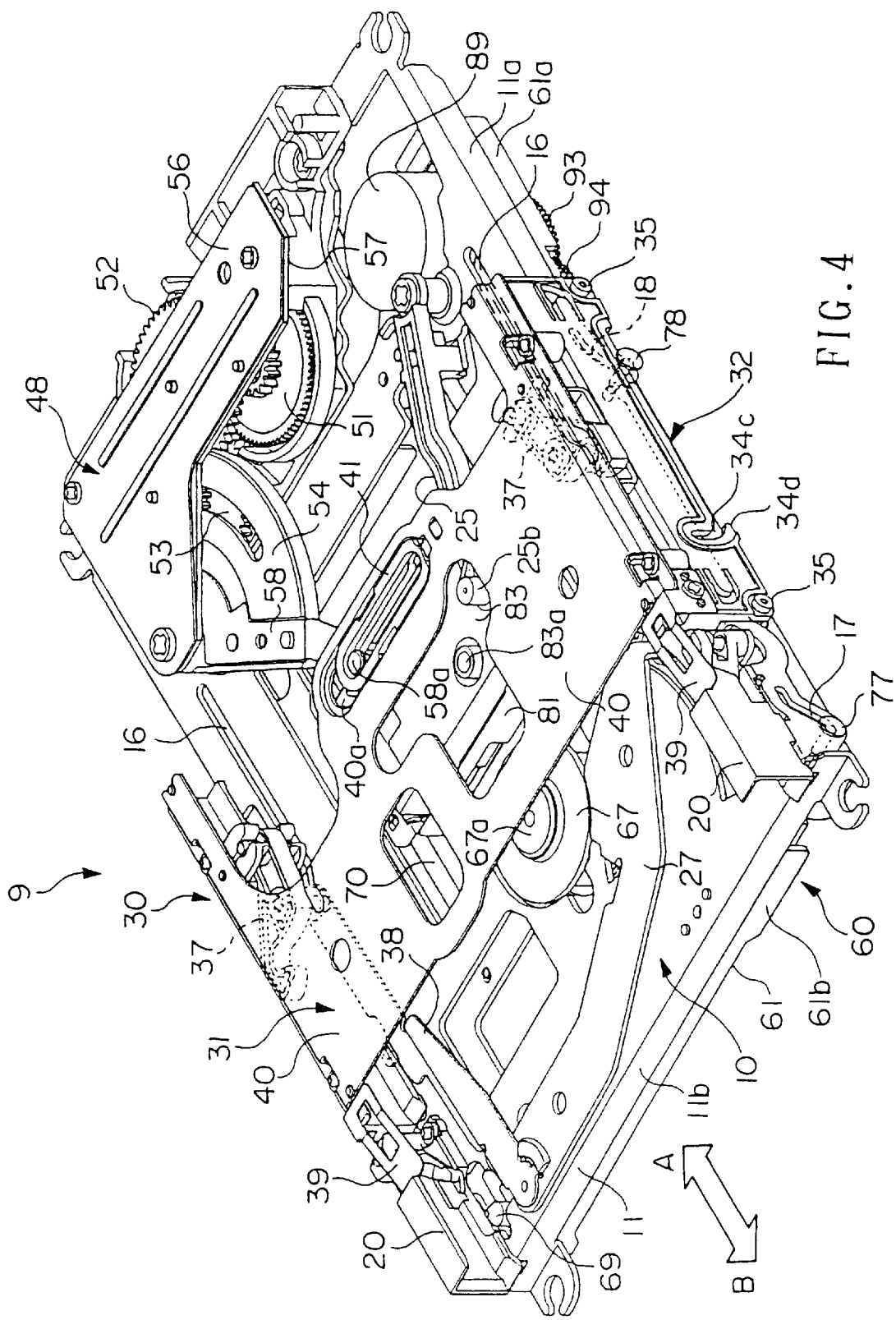
FIG. 4 is a perspective view showing the drive unit in the state in which a movable guide is at an eject position.
Figure 5:
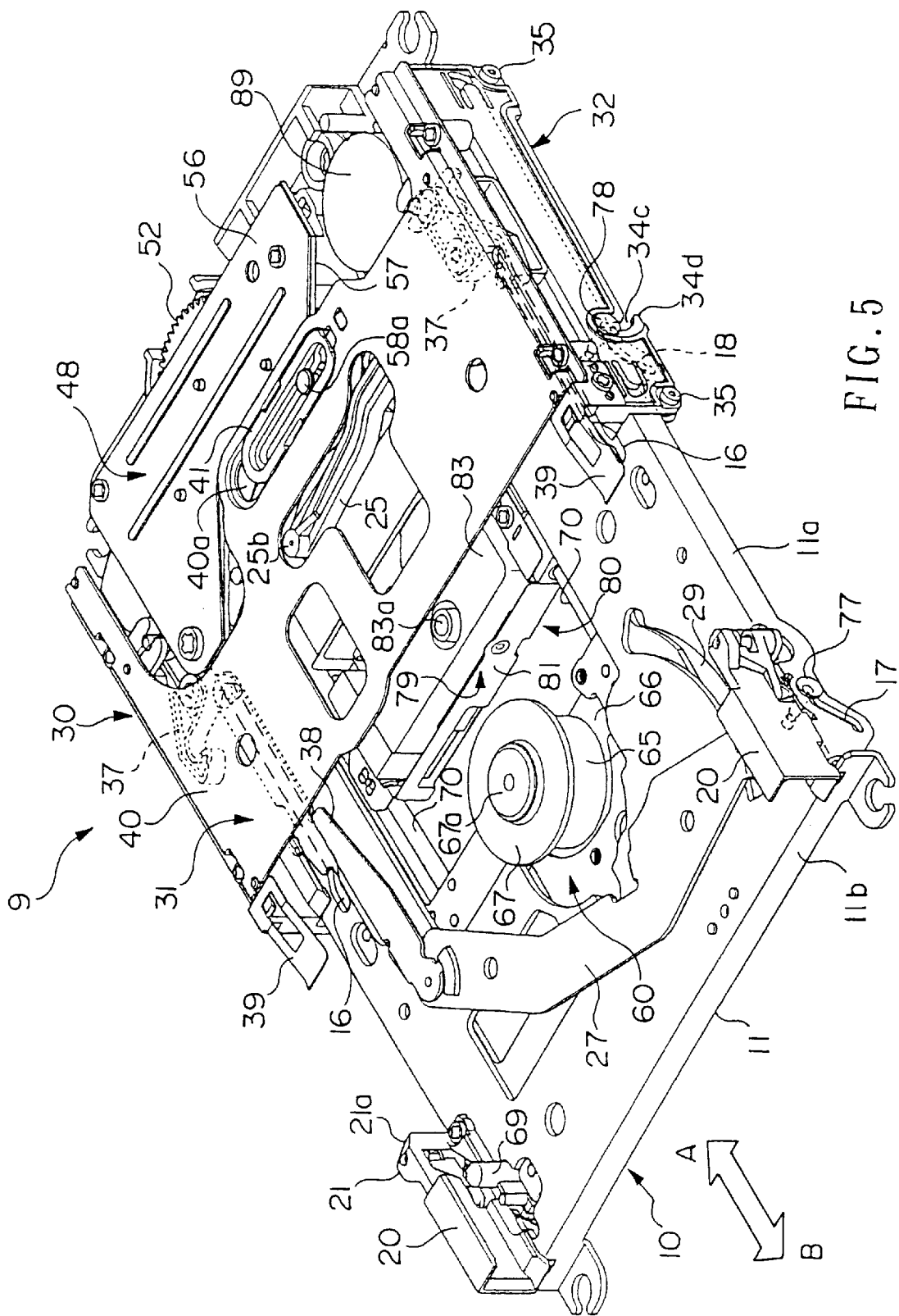
FIG. 5 is a perspective view showing the drive unit in the state in which the movable guide is at a drive position.

According to the loading unit 30, as shown in FIG. 4, when the loading motor 49 is forwardly rotated (i.e., in a withdrawing direction) with the movable guide 31 being at the eject position, the rotation of the loading motor 49 is transmitted sequentially from the first gear 51 to the second, third and fourth gears 52, 53 and 54 to rotate the fourth gear 54 in the direction of arrow J (FIG. 6). This causes the arm 58 to be rotated in the direction of the arrow J with the fourth gear 54 whereby the movable guide 31 is withdrawn to the disk drive position shown in FIG. 5. During this movement, the arm pin 58a slides rightwardly along the guide ring 41.

When the loading motor 49 is rotated reversely (i.e., in the advancing direction), the fourth gear 54 is rotated in the direction of arrow K. This causes the arm 58 to be rotated in the direction of the arrow K with the fourth gear 54 whereby the movable guide 31 advances forwardly. During this movement, the arm pin 58a slides leftwardly along the guide ring 41.

C. Traverse Unit

Referring to FIGS. 3 to 5, 12 and 13, the traverse unit 60 will now be described.

The traverse unit 60 is constructed of a traverse chassis 61 and a pickup device 80 mounted on the traverse chassis 61.

The traverse chassis 61 is made of a rectangular thin metal plate and is formed in its long edge portion and its short edge portion with bent portions 61a and 61b which are bent downwardly at a right angle. The traverse chassis 61 is formed with a central opening 62, a front recessed portion 63 and an arcuate slit 64 which correspond respectively to the central opening 12, the recessed portion 13 and the arcuate slit 29 of the main chassis 11. In the front end portion and a portion which is slightly rearward from the central portion of the bent portion 61a are formed guide pin insertion holes 77 and 78. The interval between these guide pin insertion holes 77 and 78 is the same as the interval between the cam slits 17 and 18.

A spindle motor 65 is provided in the semicircular front recessed portion 63. The spindle motor 65 is affixed to the lower surface of the traverse chassis 61 and projects slightly upwardly from the front recessed portion 63. A turntable 67 is fixed coaxially to an unillustrated drive shaft of the spindle motor 65. This turntable 67 is formed in an upwardly projecting shape in vertical section and the central projecting portion constitutes a chuck section 67a made of a magnet.

In the inside front portions of the bent portions 61a of the traverse chassis 61 are affixed guide bars 68. In the front end portions of these guide bars 68 are provided upwardly projecting positioning pins 69. These positioning pins 69 engage in the positioning holes 7 formed in the lower portion of the loaded caddy C when the caddy C has finally reached the disk drive position. The positioning pins 69 are designed to enter the positioning pin insertion holes 23 formed in the front end portion of the main chassis 11.

Figure 3:
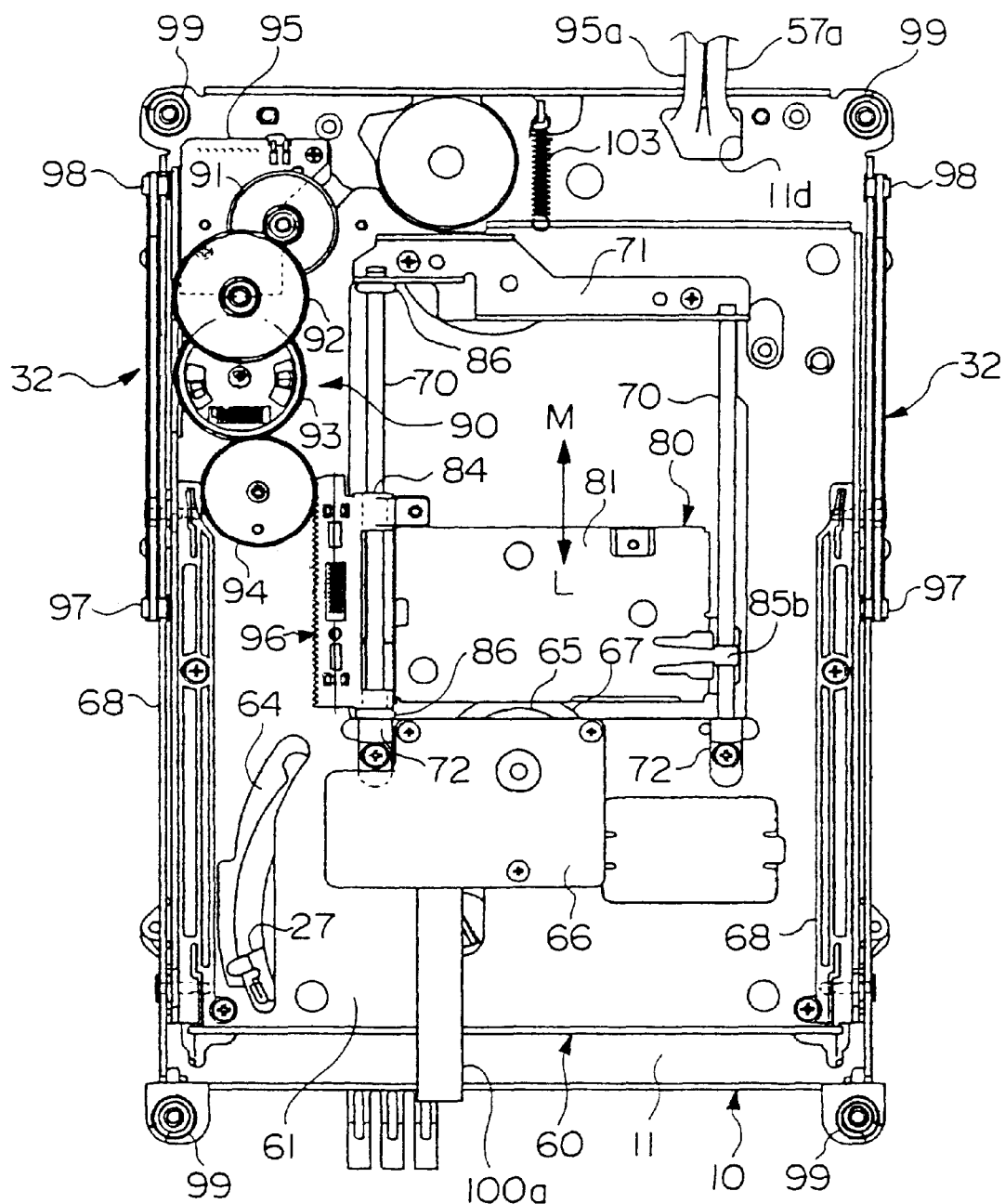
FIG. 3 is a bottom view of the drive unit.

A pair of guide shafts 70 extending in the forward and rearward direction are provided on both sides of the central opening 62. The pickup device 80 is slidable in the forward and rearward directions (in the direction of arrows L and M in FIGS. 2, 3 and 12) along the guide shafts 70. As shown in FIG. 3, the guide shafts 70 are affixed to the lower surface of the traverse chassis 61 through a support plate 71 and support holders 72.

The pickup device 80 has a head base 79 consisting of a rectangular dish-like first adjusting base 81 and a rectangular second adjusting base 82 and a holder 84 and a pickup head 83 which is mounted on the second adjusting base 82 of the head base 79. The holder 84 is affixed to the right side end portion in the longitudinal direction of the first adjusting base 81 and a vertically spaced pair of support pieces 85a and 85b are formed in the left side end portion of the first adjusting base 81. By inserting the right side guide shaft 70 in the hole 84a formed in the holder 84 and inserting the left side guide shaft 70 in a metal bearing 70a which is clamped between the upper and lower support pieces 85a and 85b, the pickup device 80 can slide in the forward and rearward direction along the guide shafts 70. The direction of movement of the pickup head device 80 is the radial direction of the loaded disk D. An object lens 83a for reading a signal on the disk D is provided in the pickup device 80. As shown in FIG. 3, cushions 86 made of rubber are provided at end portions of the right side guide shaft 70. By the abutting engagement of the end surfaces of the holder 84 with the cushions 86, a shock to the pickup device 80 is absorbed.

The pickup device 80 is moved by a pickup drive mechanism 88. This pickup drive mechanism 88 is provided in the right rear end portion of the traverse chassis 61 and comprises, as its main component parts, a feed motor 89 and a reduction gear group 90 which are rotated by the feed motor 89.

The reduction gear group 90, as shown in FIGS. 3 and 13 consists, of first, second, third and fourth gears 91, 92, 93 and 94 and are rotatably supported on the lower surface of the main chassis 11. The first gear 91 is meshed with a drive gear 89a of the feed motor 89 affixed to the traverse chassis 61. The third and fourth gears 93 and 94 are respectively composed of two wheels. To the lower surface of the traverse chassis 61 is affixed a substrate 95 including a control circuit for controlling the operation of the feed motor 89. The fourth gear 94 is meshed with a rack gear 96 provided on the outer side surface of the holder 84. The rack gear 96 is made of two gears, i.e., a affixed gear 96a formed on the outer side surface of the holder 84 and a movable gear 86b which is combined with the affixed gear 96a.

According to the pickup drive mechanism 88, when the feed motor 89 is forwardly rotated (i.e., in the scanning direction) from the state in which the pickup device 80 is at the foremost end position, the rotation of the feed motor 89 is sequentially transmitted from the first gear 91 to the second, third and fourth gears 92, 93 and 94 causing the fourth gear 94 to be rotated in the direction of the arrow J. This causes the pickup device 80 to be withdrawn with the holder 84. When the feed motor 89 is rotated in a reverse direction (reverse to the scanning direction), the fourth gear 94 is rotated in the direction of the arrow K and the pickup device 80 thereby advances forwardly.

The above description has been made about the chassis unit 10, loading unit 30 and traverse unit 60 constituting the drive unit 9. To the chassis unit 10 on which the loading unit 30 is mounted, the traverse unit 60 is mounted in the following manner.

The traverse unit 60 is disposed below the main chassis 11. The bent portions 61a and 61b of the traverse unit 60 are located inside of the bent portions 11a and 11b of the main chassis 11. The front and rear guide pin insertion holes 77 and 78 are brought into register with the cam slits 17 and 18, and the guide pins 97 and 98 are inserted from outside to these holes 77 and 78 and the cam slits 17 and 18. The guide pins 97 and 98 have head portions 97a and 98a of a larger diameter in their outer end portion and, by engagement of their inner end portions in the guide bars 68, they become integral with the traverse chassis 61. The rear guide pins 98 abut against the lower surface of the recessed portion 34b of the lower plate section 34 of the sliders 32 and, as the movable guide 31 is withdrawn, are lifted up by the lift up pawl 34d to be led to the support slits 34c. As shown in FIG. 3, a spring 103 is provided between the rear end portion of the traverse chassis 61 and the rear bent portion 11b of the main chassis 11 so as to constantly bias the traverse unit 60 rearwardly.

As shown in FIG. 1, the drive unit 9 is affixed in such a manner that flange portions 1c formed in four corners of the main chassis 11 are placed on support sections 2a formed in the lower portion of the main frame 2 through rubber dampers 99 and the two rear dampers 99 are pressed by the top cover and the front rubber dampers 99 are pressed by the unillustrated front frame.

Figure 14:
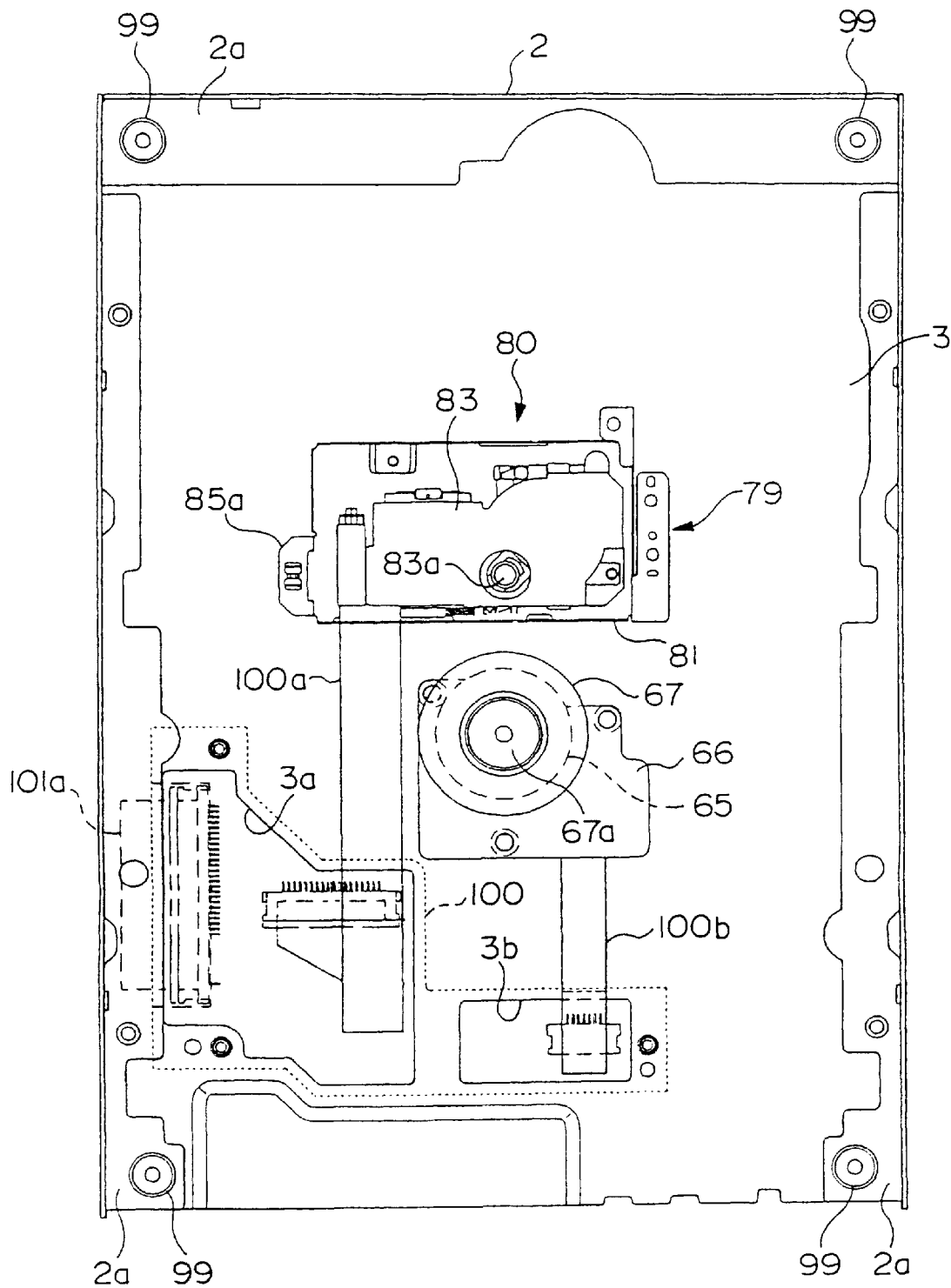
FIG. 14 is a top plan view showing a wiring structure to a pickup head and a spindle motor.
Figure 15:
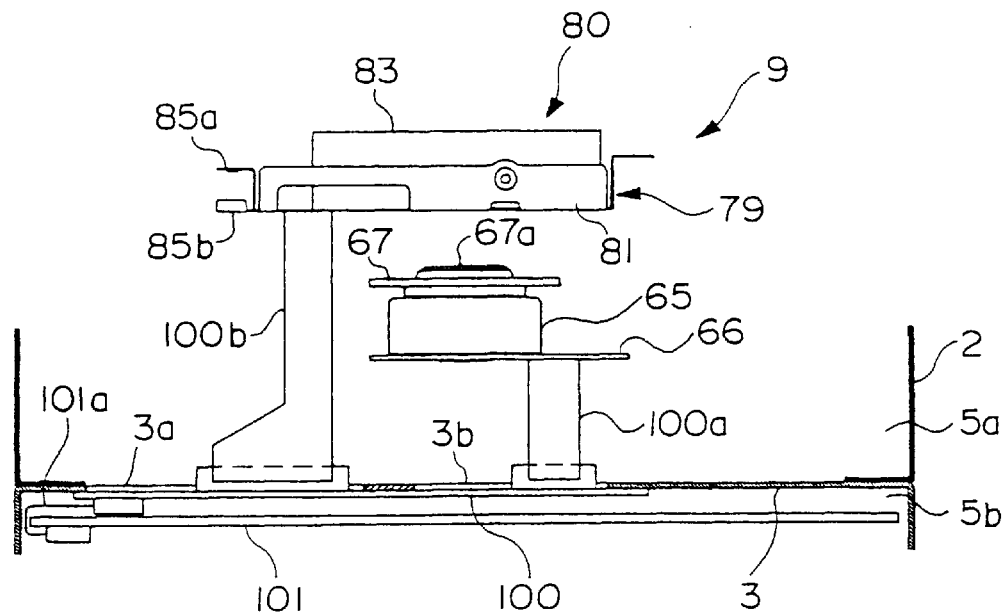
FIG. 15 is a front view of the wiring structure.
Figure 16:
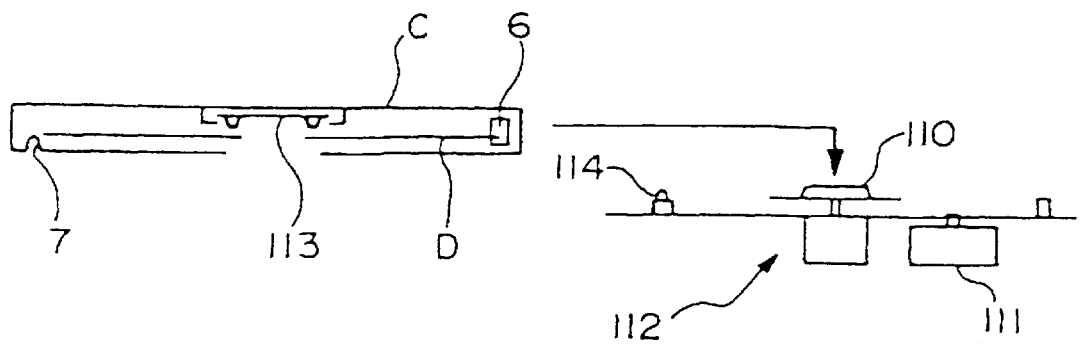
FIG. 16 is a schematic side elevation of a prior art loading device.
Figure 17:
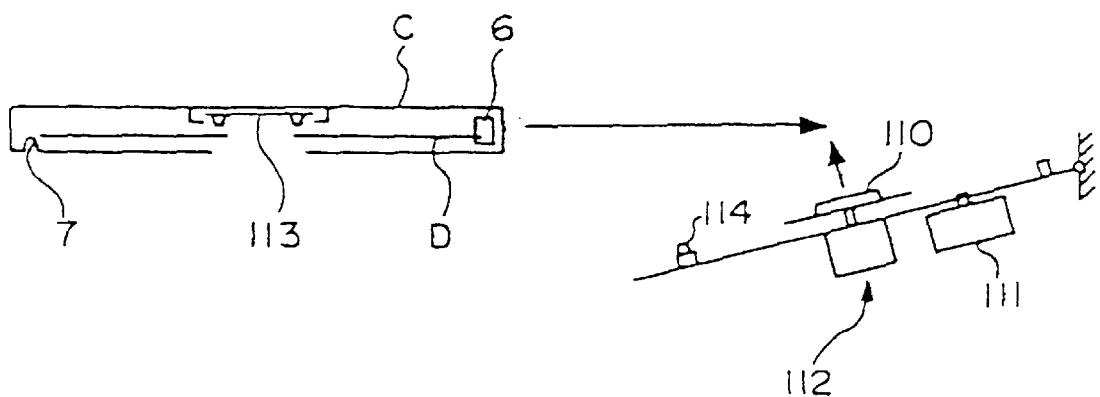
FIG. 17 is a schematic side elevation of another prior loading device.

As shown in FIG. 1, the under frame 3, which divides the drive unit chamber 5a receiving the drive unit 9 and the substrate chamber 5b, is provided below the drive unit 9 and is affixed to the support sections 2a. As shown in FIGS. 14 and 15, the under frame 3 covers the space below the main frame 2. This under frame 3 is formed at its predetermined locations with relay openings 3a and 3b which communicate the drive unit chamber 5a and the substrate chamber 5b with each other. These relay openings 3a and 3b are closed by a relay substrate 100 which is affixed to the lower surface of the under frame 3. A main substrate 101 is affixed in the substrate chamber 5b below the under frame 3 with an interval from the under frame 3. In this main substrate 101 is formed a control circuit for controlling operations of the spindle motor 65 and the pickup head 83 etc. FPC 101a, which is wiring of the main substrate 101, is connected to the relay substrate 100 through a gap between the main substrate 101 and the under frame 3. The relay substrate 100 is connected to the spindle motor 65 and the pickup head 83 through FPC 100a and FPC 100b.

As shown in FIG. 1, the bottom cover 4b is affixed to the under frame 3 and the casing 4 for the disk drive device is constructed of the bottom cover 4b, the top cover 4a and the unillustrated front panel covering the front opening. The unillustrated front panel and front frame are formed with a caddy insertion opening for inserting the caddy C into the disk drive device. The bottom cover 4b is formed with unillustrated heat dissipating openings.

As shown in FIG. 3, the main chassis 11 is formed with a wiring opening 11d for leading wirings 57a and 59a of the substrates 57 and 95 downwardly. The wirings 57a and 95a, led out of the wiring opening 11d, are further led through the under frame 3 and connected to the relay substrate 100 through the gap between the main substrate 101 and the under frame 3.

An eject pin 102, extending in the forward and rearward directions is provided in the front right portion of the under frame 3. This eject pin 102 is slidable in the forward and rearward directions and is biased forwardly by an unillustrated spring. As the eject pin 102 is pushed rearwardly when the movable guide 31 is at the disk drive position (withdrawn position), the pin 102 abuts against the engaging pawl 27b of the eject lever 27 to further push the movable guide 31.

(2) Operation of the Embodiment

The operation of the disk drive device of the above described structure and advantageous results derived therefrom will now be described.

When the caddy C is not loaded in the disk drive device, the movable guide 31 is always at the foremost end eject position. The eject position of the movable guide 31 is determined by engagement of the guide pins 37c of the hook levers 37 with the front edges of the hook cam slits 16. At this time, the hook sections 37a of the hook levers 37 are received in the openings 33d of the guide sections 33 of the sliders 32.

The traverse unit 60 is stopped at its foremost end position by engaging the front and rear guide pins 97 and 98 in the stop hole sections 17a and 18a of the front and rear cam slits 17 and 18 of the main chassis 11. Since the stop hole sections 18a of the rear cam slits 18 are not extending in the forward and rearward direction, the rear guide pins 98 are restricted in their movement in the forward and rearward directions. By this arrangement, the traverse unit 60 is stopped in a stable state.

The clamp 39 is on the inclinating surface 21a of the fixed guide 20 and the arm 58 of the loading unit 30 is located at a front position with its arm pin 58a located in the leftward-most position in the guide ring 41 and the open lever 25b extends forwardly. The right end portion of the eject lever 27 is located rearwardly.

The caddy C is now inserted into the disk drive device from this state in which the movable guide 31 is at the eject position. The caddy C is inserted from the end portion in which the shutter 8 is provided with the shutter 8 facing downwardly. The rear end portion of the caddy C comes into an abutting engagement at both sides thereof with the receiving surfaces 37b of the hook levers 37. As the caddy C is further pushed in, the movable guide 31 is withdrawn and the guide pins 37c, which are guided along the hook cam slits 16, are rotated inwardly whereby the hook sections 37a engage in the hook holes 6 of the caddy C. The caddy C thereby is received by the movable guide 31 and is withdrawn with the movable guide 31. The pin 25b at the foremost end portion of the open arm 25 engages with the shutter 8 to gradually open the shutter 8. As the movable guide 31 is withdrawn, the arm 58 is withdrawn rearwardly whereby the fourth gear 54 of the drive mechanism 48 is rotated in the direction of the arrow J. When the fourth gear 54 has reached a certain rotated position, a drive signal is given from the photosensor provided in the substrate 57 to the loading motor 49 and the loading motor 49 thereby starts a forward rotation. From this point, the movable guide 31 is pulled in rearwardly by the arm 58 by further rotation of the fourth gear 54 in the same direction. That is, the movable guide 31 is withdrawn by the force of the loading motor 49.

In the course of this withdrawal, the lift up pawls 34d of the sliders 32 engage with the rear guide pins 98. The pins 98, which are guided along the support slits 34c, are elevated and withdrawn while they are elevated along the rear cam slits 18. The front guide pins 97 withdraw while being elevated along the front cam slits 17. In this manner, by withdrawal of the front and rear guide pins 97 and 98 while being elevated along the front and rear cam slits 17 and 18, the traverse unit 60 as a whole is elevated while approaching the main chassis 11 and withdrawing with the movable guide 31.

In this case, the front and rear guide pins 97 and 98 are elevated from the stop hole sections 17a, 18a of the front and rear cam slits 17 and 18 along the lift up sections 17b and 18b. Since the lift up sections 18b of the rear cam slits 18 rise with the inclination angle which is larger than the inclination angle of the lift up sections 17b of the front cam slits 17, the traverse unit 60 withdraws in an inclined posture with its rear end portion being lifted up. Alternatively stated, the interval between the traverse unit 60 and the main chassis 11 becomes gradually larger from the rear end portion toward the front end portion. As the front and rear guide pins 17 and 18 approach the pull-in sections 17c and 18c, the height of the front end portion of the traverse chassis 61 approaches the height of the rear end portion thereof and, when the guide pins 97 and 98 have entered the pull-in sections 17c and 18c, the traverse chassis 61 becomes parallel to the main chassis 11. Thereafter, when the guide pins 97 and 98 have withdrawn to the disk drive position of the caddy C at which the guide pins 97 and 98 abut against the rear edges of the pull-in sections 17c and 18c, the loading motor 49 is stopped. The traverse unit 60 is withdrawn by the loading motor 49 and the pulling force of the spring 103.

In the course of the movement of the traverse unit 60 to the disk drive position, the turntable 67 withdraws while being gradually elevated with the behaviour of the traverse chassis 61. At the disk drive position, the turntable 67 enters the front recessed portion 13 of the main chassis 11 and the central chuck section 67a is attracted to the portion-to-be-chucked which is the central portion of the disk D. The positioning pins 69 also are elevated and enter the positioning holes 7 of the caddy C through the positioning pin insertion holes 23 whereby the caddy C is held in position. Further, as the caddy C withdraws, the open arm 25 is rotated in the direction of the arrow E to open the shutter 8. The eject lever 27 is rotated in the direction of the arrow H to position the engaging pawl 27b at the front position.

When a disk drive order is given in this state, the spindle motor 65 is rotated to rotate the disk D. The feed motor 89 also is rotated to displace the pickup device 80 in the direction of the arrow M or L. This causes the pickup head 83 to read a signal from the recording surface of the disk D or write a signal on the recording surface of the disk D through the opening of the caddy C which has been opened by the open arm 25.

When driving of the disk D is stopped and an order to take out the caddy C is given, the loading motor 49 is rotated reversely and the movable guide 31 is pushed by the arm 58 which is rotated in the direction of the arrow K with the fourth gear 54 whereby the caddy C is caused to advance with the movable guide 31 in an operation which is reverse to the loading operation. In this advance course, when the guide pins 97 and 98 advance in the pull-sections 17c and 18c of the front and rear cam slits 17 and 18, the movable guide 31 and the traverse unit 60 advance in parallel to the main chassis 11. Thereafter, the traverse unit 60 advances to the eject position with the front end portion of the traverse unit 60 being spaced apart from the main chassis 11 earlier than the rear end portion of the traverse unit 60. At the eject position, the hook sections 37a of the hook levers 37 are disengaged from the hook holes 6 of the caddy C and the front end portion of the caddy C comes out of the device, so that the caddy C can be taken out of the device.

In a case where, for some reason, the movable guide 31 does not advance and therefore the caddy C cannot be taken out of the device, the caddy C can be compulsorily taken out by pushing in the eject pin 102 rearwardly. Upon pushing in of the eject pin 102, the rear end surface of the eject pin 102 abuts against the engaging pawl 27b of the eject lever 27 and, by pushing in the eject pin 102 further, the eject lever 27 is rotated in the direction of the arrow G and the transmission lever 38 pulls the movable guide 31 forwardly through the guide pins 37c of the hook levers 37. The caddy C thereby is caused to advance compulsorily to the eject position.

According to the above described disk drive device, when the movable guide 31 which has received the inserted caddy C, withdraws and, in the course of this withdrawal, the traverse unit 60 is engaged with the movable guide 31 and withdraws with the movable guide 31, the traverse unit 60 withdraws with its angle of inclination becoming gradually smaller from the inclined state in which the front end portion of the traverse unit 60 is lower than the rear end portion thereof and becomes parallel to the main chassis 11 at the disk drive position. By this withdrawing operation of the traverse unit 60, the turntable 67 approaches the portion-to-be-chucked of the disk D relatively from beneath the portion-to-be-chucked and is attracted to it by slightly pivoting at a position immediately before the disk drive position. Accordingly, there is no substantial change in the angle in the operation for causing the turntable 67 to be attracted to the disk D but the turntable 67 is attracted to the disk D with a series of continuous operations. Thus, malfunction in chucking of the disk D to the turntable 67 is not likely to occur and the disk D can be always driven accurately. Besides, in taking out the disk D, after the turntable 67 is moved slightly forwardly, it is pivoted so that the front end portion is lowered and, therefore, the turntable 67 is disengaged smoothly from the disk D and a driving force necessary for disengaging the turntable 67 from the disk D can be minimized.

Since the hook sections 37a of the hook levers 37 are engaged with the hook holes 6 provided on both sides of the caddy C and the caddy C is pulled in together with the movable guide 31, the caddy C is moved to the disk drive position maintaining a correct posture. Hence, the disk D can always be positioned accurately whereby the effect of preventing malfunction in chucking is enhanced.

The caddy C, which withdraws in the state received in the movable guide 31, is pressed downwardly by the clamps 39 provided on both sides of the front end portion of the movable guide 31 and, therefore, the movement of the caddy C in the movable guide 31 is restricted whereby behaviour of the caddy C during moving and disk driving is restricted. Accordingly, trouble in the driving of the disk D due to shaking, etc. of the caddy C will be prevented. Further, since the foremost end portion of the clamps 39 ride on the inclined surface 21 of the affixed guide 20 when the movable guide 31 is at the eject position and elastically restore to abut against the upper surface of the caddy C when the movable guide 31 withdraws, the clamps 39 do not slide against the caddy C. Therefore, no scratch is produced on the surface of the caddy C by the clamps 39 and no sliding resistance due to the clamps 39 is produced whereby the caddy C can be inserted smoothly into the movable guide 31.

Since the relay openings 3a and 3b of the under frame 3 provided between the drive unit 9 and the main substrate 101 are closed by the relay substrate 100, the drive unit 9 and the main substrate 101 are interrupted substantially completely from each other without having a communicating space therebetween. Hence, heat of the main substrate 101 is not transmitted to the drive unit 9 and besides electric shielding between them is improved. Therefore, malfunction of the drive unit 9 caused by heating of the main substrate 101 or insufficient electric shielding can be prevented. Particularly, the behaviour of the pickup head 83, which is susceptible to heat, is stabilized without being affected by heating. Further, dust, which may enter the device from the heat dissipating holes formed in the bottom cover 4b, is shielded by the under frame 3 and does not enter the drive unit 9 so that the drive unit 9 can be maintained free from dust. Furthermore, by closing the relay openings 3a and 3b formed in the under frame 3 for electrical conductivity with the relay substrate 100 which is a necessary component part, sealing material for preventing dust can be saved with the result that the number of component parts is reduced and assembly of the device is facilitated.

What is claimed is:

1. A disk drive device comprising:
   a chassis;
   a loading unit for moving a disk containing caddy inserted to an eject position on the chassis in a loading direction to a disk drive position and moving back the disk containing caddy from the disk drive position in an unloading direction to the eject position; and
   a traverse unit having a turntable which is attracted to the disk which has reached the disk drive position and rotates the disk and therein reads a signal recorded on the disk or writes a signal on the disk while the disk is rotated by the turntable;
   said loading unit comprising a movable guide provided on the chassis, said movable guide movable between the eject position and the disk drive position and receiving the inserted disk containing caddy at the eject position, and a drive unit for moving said movable guide, and
   said traverse unit engageable with the movable guide and movable in the loading and unloading directions and in a direction transverse to the loading and unloading direction as the movable guide is moved, and also being connected to the chassis through a guide member in such a manner that, when the movable guide is at the eject position, the turntable is spaced apart by a predetermined distance from the disk and, as the movable guide moves in the loading direction, approaches the disk and, when the movable guide reaches the disk drive position, is attracted to the disk.

2. A disk drive device as defined in claim 1 wherein said caddy has engaging portions on both sides thereof in the loading direction and said movable guide has portions-to-be-engaged which are engaged with said engaging portions when the movable guide has received the caddy.

3. A disk drive device as defined in claim 1 wherein an elastic member which presses the caddy elastically to the movable guide is provided in a forward end portion in the unloading direction of the movable guide.

4. A disk drive device as defined in claim 3 which further comprises a fixed guide provided at a forward end portion in the unloading direction of the chassis for guiding the inserted caddy to the movable guide located at the eject position and, when the movable guide is at the eject position, spacing the elastic member away from the caddy.

5. A disk drive device as defined in claim 1, wherein the traverse unit has a traverse chassis having the turntable mounted thereon, the traverse chassis being independent of said chassis and movable with respect to said chassis in the loading and unloading directions and the direction transverse to the loading and unloading directions.

6. A disk drive device as defined in claim 5, wherein the traverse unit is movable in the loading and unloading directions while moving in the direction transverse to the loading and unloading directions.

7. A disk drive device as defined in claim 5, wherein said chassis has at least one pair of cam slots extending in the loading direction and angled with respect to the loading direction, and the traverse chassis has at least one pair of guide pins that slidably engage the at least one pair of cam slots of said chassis so that the transverse unit is movable in the loading and unloading directions while moving in the direction transverse to the loading and unloading directions.

8. A disk drive device as defined in claim 3, wherein said chassis has a pair of front cam slots extending in the loading direction and sloped at a first angle with respect to the loading direction and a pair of rear cam slots extending in the loading direction and sloped at a second angle with respect to the loading direction, the second angle of the pair of rear cam slots being greater than the first angle of the pair of front cam slots, and the traverse chassis has a pair of front guide pins that slidably engage the pair of front cam slots and a pair of rear guide pins that slidably engage the pair of rear cam slots, so that the transverse unit is movable in the loading and unloading directions while changing an angle thereof with respect to said chassis.

9. A disk drive device comprising:
   a chassis;

a loading unit for moving a disk containing caddy inserted to an eject position on the chassis in a loading direction to a disk drive position and moving back the disk containing caddy from the disk drive position in an unloading direction to the eject position; and a traverse unit having a turntable which is attracted to the disk which has reached the disk drive position and rotates the disk and therein reads a signal recorded on the disk or writes a signal on the disk while rotating the disk by means of the turntable;

said chassis having a pair of bent edge portion extending in the loading direction and a cam slit formed in each of the bent edge portions, each of said cam slits extending in the loading direction and having a portion which rises gradually in the loading direction;

said loading unit comprising a movable guide provided on the chassis, said movable guide movable between the eject position and the disk drive position and receiving the inserted disk containing caddy at the eject position, and a drive unit for moving said movable guide, and said traverse unit engageable with the movable guide and movable in the loading and unloading directions and a direction transverse to the loading and unloading directions as the movable guide is moved, and guide pins which are adapted to be engaged in said cam slits formed in the chassis and move along said cam slits in such a manner that, when the movable guide is at the eject position, the turntable is spaced apart by a predetermined distance from the disk and, as the movable guide moves in the loading direction, approaches the disk and, when the movable guide reaches the disk drive position, is attracted to the disk.

10. A disk drive device as defined in claim 9 wherein each of said cam slits consists of a stop hole section formed in the front lower portion of the bent edge portion and extending rearwardly, a lift up section extending rearwardly from the stop hole section and obliquely upwardly by a predetermined angle and a horizontal section extending rearwardly from the lift up section.

11. A disk drive device as defined in claim 9, wherein the traverse unit has a traverse chassis having the turntable mounted thereon, the traverse chassis being independent of said chassis and movable with respect to said chassis in the loading and unloading directions and the direction transverse to the loading and unloading directions.

12. A disk drive device as defined in claim 11, wherein the traverse unit is movable in the loading and unloading directions while moving in the direction transverse to the loading and unloading directions.

\* \* \* \* \*